United States Patent Office 3,416,317
Patented Dec. 17, 1968

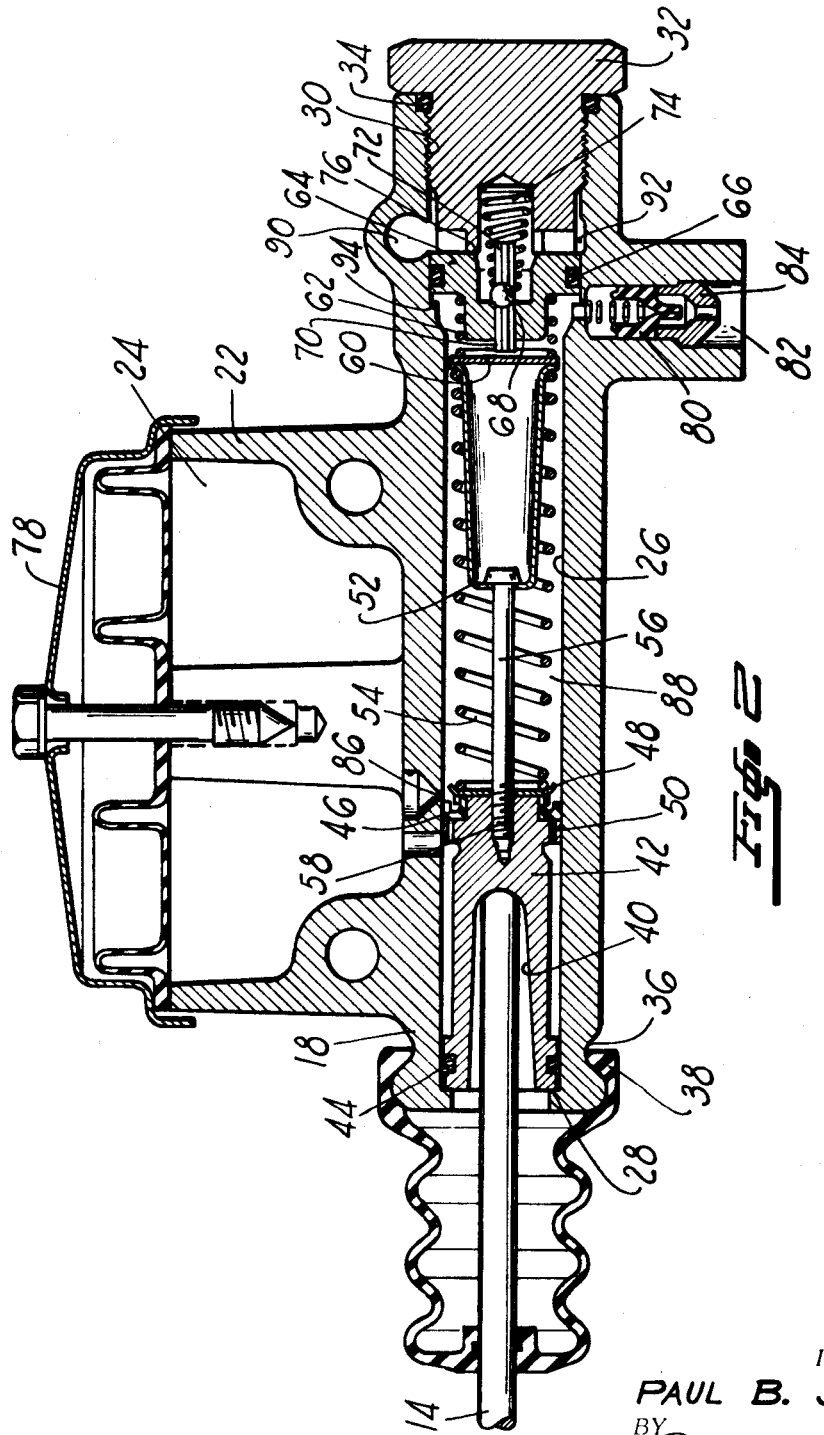

3,416,317
MASTER CYLINDER
Paul B. Shutt, St. Joseph, Mich., assignor to The Bendix Corporation, a corporation of Delaware
Filed May 22, 1967, Ser. No. 640,065
5 Claims. (Cl. 60—54.6)

ABSTRACT OF THE DISCLOSURE

A master cylinder having first and second pistons for developing separate pressures in separate chambers with first and second piston valve means operatively related to said first and second pistons with each of said first and second piston valve means having valve elements operable upon translation of said first and second pistons within the bores of the master cylinder to communicate the pressure being developed in the respective chamber to a passage means communicable to the other chamber for the other piston.

SUMMARY OF INVENTION

Prior art devices of the type as improved by this invention have generally been employed in utilizing braking systems as steering means in addition to their function as providing line pressure for the brake system whenever it is desired to stop the associated vehicle.

It has been observed that in such prior art devices a problem of unequal pressure exists whenever a braking system is being employed to stop the vehicle in that it has been virtually impossible to equate the system pressure for the separate braking means when they are being simultaneously actuated.

It is a principal object of this invention to provide means for equating system pressures of separate braking systems when they are being actuated simultaneously which will permit the actuation of the separate braking systems independently for steering, and at the same time permit thermal expansion without affecting the attendant valve elements.

BRIEF DESCRIPTION OF THE DRAWINGS

FIGURE 2 is a cross sectional side view taken along lines 2—2 of FIGURE 1 showing one of the cylinders of the master cylinder with its parts assembled therein that are duplicated in the other cylinder thereof.

DETAILED DESCRIPTION

Figure 1:
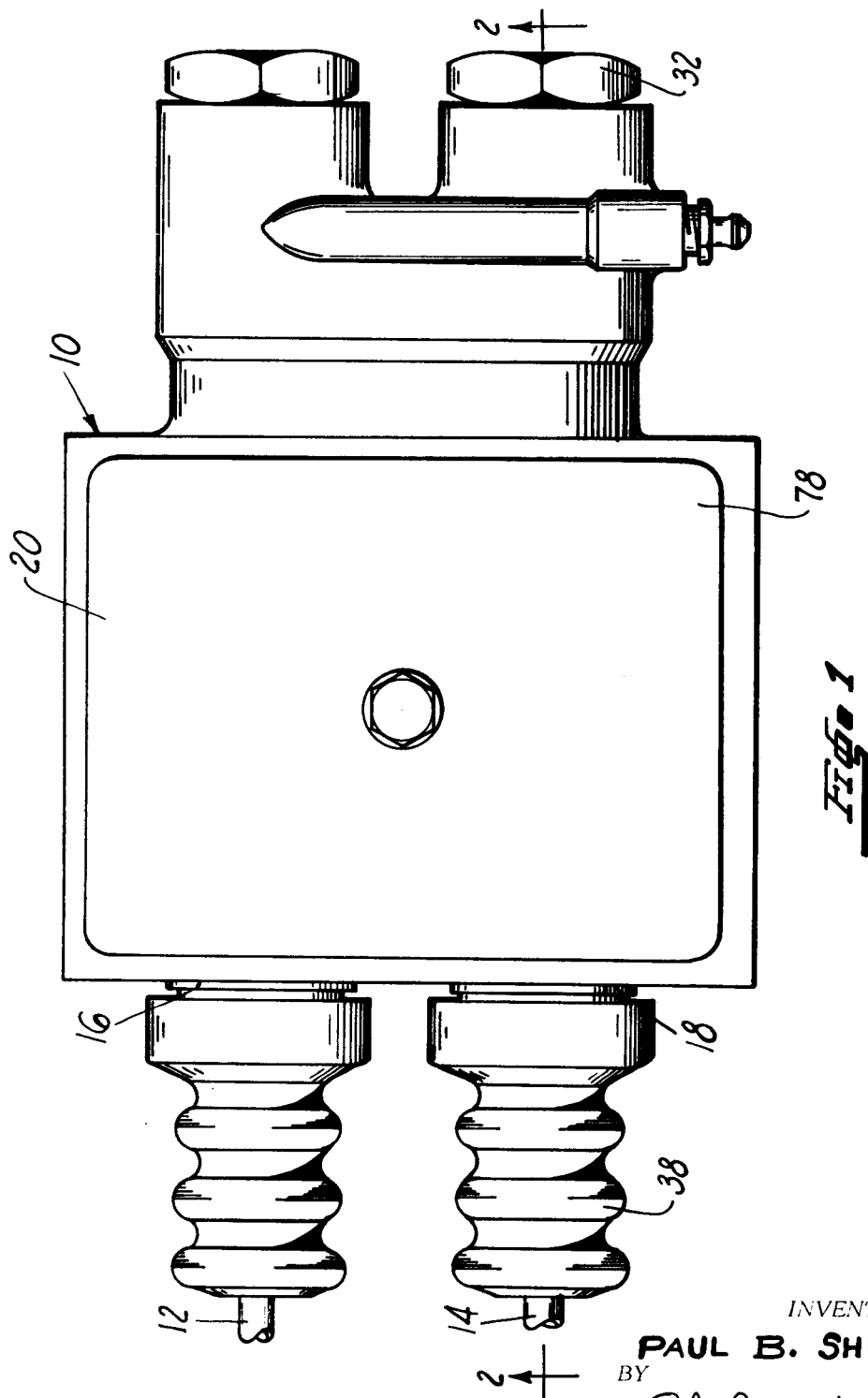
FIGURE 1 is a plan view of a master cylinder in accordance with the principles of this invention.

With reference now to FIGURE 1 there is shown a tandem master cylinder 10 actuatable by separate push rods 12 and 14 operatively connected to piston means within separate cylinders 16 and 18. The master cylinder is provided with a fluid reservoir 20 having inlet ports communicable to both the cylinders 16 and 18. With regard now to a more particular description of the elements within the master cylinder, attention is directed to FIGURE 2 showing the master cylinder to be generally formed by casting a housing 22 having a reservoir cavity 24 and separate bores, one of which as at 26, being shown. As may be expected by those skilled in the art to which the invention relates, after the housing 22 has been cast, it is machined to provide the desired finish to the bore 26 in such a manner as to also provide return stop flange 28 at the rear of the bore 26, and the other end of the bore is threaded as at 30 for the receipt of a plug 32 sealed by an O-ring 34 upon the completion of the assembly of the inner parts. It should also be noted that the housing 22 is formed with a depression 36 for the receipt of the forward end of a rubber boot 38 that is placed about the push rods such as the rod 14 after the assembly of the rod within a recess 40 of the master cylinder piston 42.

The construction of the master cylinder piston 42 employs a secondary seal 44 at its rear flange and has a lip seal 46 at its forward flange held thereto by a spring and seal retainer 48 over a plurality of axial passages 50.

To the piston 42 a case spring assembly comprising a forward spring retainer 52 and a spring 54 is assembled by means of a bolt 56 threaded to the piston 42 as at 58. After assembly of the piston 42 and the caged spring assembly within the bore 26 to rest against the stop 28, a plate 60 is placed over the spring retainer 52 and a spring 62 is inserted into the bore. This spring bearing surface may be formed with the retainer 52. Next a piston valve 64 having an O-ring 66 cooperating with a stepped-up portion of the bore 26 is placed on the spring 62. This piston valve is axially drilled for the receipt of a ball check 68 having a rearwardly extending grooved projection 70 and a forwardly extending projection 72 over which a valve biasing spring 74 is fitted. Then upon the assembly of the plug 32 to the housing 22 within the bore 26 the ball check 68 is forced against a seat around the axially drilled opening through the piston valve means 64 and the piston 42 is held against the stop 28 while the piston valve 64 is abutting stop 76 formed on the plug 32. The assembly of the master cylinder is completed by attaching the reservoir cap 78 over the reservoir cavity 24 and the insertion of a spring biased residual pressure check valve 80 within a discharge port 82 by the press fitting of a tube seat 84 therewithin.

OPERATION

When the operator of the associated vehicle desires to actuate one or the other of the cylinders 16 or 18, or both, he will move the push rods 12 and/or 14 inwardly to translate the piston 42 whereby the lip seal 46 will pass over compensating port 86 of each of the cylinders 16 and 18 to terminate the communication of the fluid within the reservoir cavity 24 to within the pressurizable chamber 88 of each of the cylinders 16 or 18 ahead of the piston 42. At first, this translation of the piston 42, after closing of the compensating port 86, will abut the plate 60 upon the projection 70 of the ball check 68 to remove it from the seat about the drilled opening through the piston valve means 64. Thus, pressure will flow not only to the outlet port 84, but to a connecting passage 90 thereby communicating the pressure being developed in the chamber 88 not only to the equalizing chamber 92 ahead of the piston valve means 64, but via the passage 90 to the other equalizing chamber of the other cylinder. If the other piston in the other cylinder has been actuated, this pressure will be communicated, assuming the pressure being developed in the other cylinder as of lower magnitude than that in the cylinder 18, through the piston valve means of that cylinder into the pressure developing chamber whereby the pressures from both of the cylinders 16 and 18 are equated.

If, on the other hand, the other cylinder has not been actuated, as by the depressing of the push rod, for instance push rod 12, when the push rod 14 has been depressed, the chamber being pressurized by the push rod 14 will not be communicated to the other chamber, but merely to the equalizing chamber 92 and the passage 90 in that the ball check of the other piston valve means will not have been opened.

As is to be expected, thermal expansion will no doubt take place in the equalizing chambers 92 and the passage 90. When it does, it will translate the piston valve means 64 away from the stop 76 of the plug 32 toward a shoulder 94 of the housing 22 to eliminate any adverse effects this thermal expansion may have on the valving elements within the master cylinder.

Having fully described an operative construction utilizing the principles of my invention it is now desired to set forth the scope of protection sought by the appended claims.

I claim:
1. In a master cylinder housing having first and second operable piston means for developing separate pressures for separate fluid outlets from said housing, a means to utilize pressures delivered through said separate outlets, a means to equalize the pressures delivered through said separate outlets, said means comprising:
   passage means opening to discharge chambers of each of said first and second piston means;
   piston valve means in each of said discharge chambers ahead of said first and second piston means biased to close communication of said passage means on the opposite side of said piston valve means from said first and second piston means, said piston valve means having a passage means therethrough with an operatively biased valve normally closing said passage through said piston valve means; and
   means projecting from each of said first and second piston means for operating said valve means in the passage of said piston valve means upon the movement of said first and second piston means.

2. A master cylinder housing comprising:
   a housing having first and second bores open at one end and communicated by passage means at another end with discharge ports adjacent said passage means;
   first and second piston valve means in said first and second bores between said discharge port and said passage means, said first and second piston valve means having a passage therethrough normally closed by a check valve means;
   first and second pistons in said first and second bores, said first and second pistons each including means for operating said check valve means of said first and second piston valve means; and
   means to bias said first and second piston valve means and said first and second pistons against stops provided in first and second bores at opposite ends of said housing.

3. A master cylinder according to claim 2 wherein said first and second piston valve means and said first and second pistons are operatively connected by spring means forming the means to bias said first and second piston valve means and said first and second pistons against the respective stops at each end of said housing.

4. A master cylinder according to claim 3 wherein said check valve means of said first and second piston valve means is characterized as a ball check having a grooved projection extending through said piston valve means to project beyond the face of said first and second piston valve means towards said first and second pistons.

5. A master cylinder according to claim 4 wherein said first and second pistons are operatively connected with caged spring assemblies that are in turn biased by a spring between the caged spring assembly and the first and second piston valve means to maintain said first and second pistons against stops at the rear of said housing, said caged spring assemblies having a spring bearing surface operatively arranged with respect to said grooved projection of said ball check to operate same upon movement of said first and second pistons to remove said ball check from a seat of said first and second piston valve means.

References Cited

UNITED STATES PATENTS

| | | | |
|---|---|---|---|
| 3,058,309 | 10/1962 | Smith | 60—54.6 |
| 3,064,434 | 11/1962 | Parrett | 60—54.6 |
| 3,345,112 | 10/1967 | Kershner | 303—6 |

MARTIN P. SCHWADRON, *Primary Examiner.*

ROBERT R. BUNEVICH, *Assistant Examiner.*

U.S. Cl. X.R.

188—152